US008312420B1

(12) United States Patent
Brewton et al.

(10) Patent No.: US 8,312,420 B1
(45) Date of Patent: Nov. 13, 2012

(54) SYSTEM AND METHOD FOR PERFORMING STRUCTURAL TEMPLATIZATION

(75) Inventors: Nathan E. Brewton, Wayland, MA (US); Pieter J. Mosterman, Framingham, MA (US)

(73) Assignee: The MathWorks, Inc., Natick, MA (US)

( * ) Notice: Subject to any disclaimer, the term of this patent is extended or adjusted under 35 U.S.C. 154(b) by 1770 days.

(21) Appl. No.: 11/283,564

(22) Filed: Nov. 18, 2005

(51) Int. Cl.
*G06F 9/44* (2006.01)

(52) U.S. Cl. .................. 717/105; 717/109; 717/113

(58) Field of Classification Search .................. None
See application file for complete search history.

(56) References Cited

U.S. PATENT DOCUMENTS

| | | | |
|---|---|---|---|
| 5,325,533 A | 6/1994 | McInerney et al. | |
| 6,044,211 A * | 3/2000 | Jain .................. | 716/18 |
| 6,059,838 A | 5/2000 | Fraley et al. | |
| 6,085,030 A | 7/2000 | Whitehead et al. | |
| 6,226,792 B1 | 5/2001 | Goiffon et al. | |
| 6,230,309 B1 | 5/2001 | Turner et al. | |
| 6,282,699 B1 * | 8/2001 | Zhang et al. .................. | 717/109 |
| 6,505,342 B1 * | 1/2003 | Hartmann et al. ............ | 717/104 |
| 6,560,770 B1 | 5/2003 | Saxena et al. | |
| 6,826,579 B1 | 11/2004 | Leymann et al. | |
| 6,985,939 B2 * | 1/2006 | Fletcher et al. ............... | 709/223 |
| 6,993,469 B1 * | 1/2006 | Bortfeld .......................... | 703/15 |
| 7,000,224 B1 | 2/2006 | Osborne, II et al. | |
| 7,062,718 B2 * | 6/2006 | Kodosky et al. .............. | 715/771 |
| 7,099,809 B2 * | 8/2006 | Dori .................................. | 703/6 |
| 7,120,896 B2 * | 10/2006 | Budhiraja et al. ............. | 717/105 |
| 7,124,399 B2 | 10/2006 | Menon et al. | |
| 7,194,726 B2 * | 3/2007 | Allen et al. .................... | 717/104 |
| 7,219,328 B2 * | 5/2007 | Schloegel et al. ............. | 717/104 |
| 7,367,012 B2 * | 4/2008 | Szpak et al. ................... | 717/106 |
| 7,420,573 B1 * | 9/2008 | Aberg et al. .................. | 345/630 |
| 7,496,888 B2 | 2/2009 | Sanjar et al. | |
| 7,562,339 B2 | 7/2009 | Racca | |
| 7,676,787 B2 | 3/2010 | Pepin | |
| 7,681,176 B2 | 3/2010 | Wills et al. | |
| 2002/0082811 A1 | 6/2002 | Honjas et al. | |
| 2003/0159131 A1 | 8/2003 | Litoiu et al. | |
| 2004/0148586 A1 * | 7/2004 | Gilboa .......................... | 717/108 |

(Continued)

OTHER PUBLICATIONS

Stewart et al., Design of Dynamically Reconfigurable Real-time Software Using Port-Based Objects, published by IEEE Transactions on software engineering, vol. 23, No. 12, Dec. 1997, pp. 759-776.*
Gomaa et al., Design and Perfomance Modeling of Component Interconnection Patterns for Distributed Software, published by ACM 1-58113-195-X/00/09, 2000, pp. 117-126.*

(Continued)

*Primary Examiner* — Tuan Q Dam
*Assistant Examiner* — Zheng Wei
(74) *Attorney, Agent, or Firm* — Nelson Mullins Riley & Scarborough LLP

(57) ABSTRACT

A mechanism for graphically performing structural templatization in a graphical model is discussed. A model component with a defined interface is designated as an "interface component" and includes at least one external interface port and one or more internal ports. An instance of the interface component is instantiated in a graphical model and exposes the external interface port. A user also instantiates in the graphical model an instance of a component that is designated as an "implementation component" that includes model functional content and which exposes an implementation port. The user connects the exposed interface port and implementation port and the internal port information from the interface component programmatically merges with the content of the implementation component. The model designer is thus able to concentrate on separately providing interface and content information during the design of the graphical model.

40 Claims, 10 Drawing Sheets

U.S. PATENT DOCUMENTS

| | | | |
|---|---|---|---|
| 2005/0005261 A1 | 1/2005 | Severin | |
| 2005/0028133 A1 | 2/2005 | Ananth et al. | |
| 2005/0138045 A1 | 6/2005 | Zarrinkoub et al. | |
| 2006/0101431 A1 | 5/2006 | Pepin et al. | |
| 2006/0200799 A1 | 9/2006 | Wills et al. | |
| 2006/0206860 A1* | 9/2006 | Dardinski et al. | 717/105 |
| 2006/0206866 A1* | 9/2006 | Eldrige et al. | 717/122 |
| 2008/0098349 A1 | 4/2008 | Lin et al. | |
| 2008/0183440 A1 | 7/2008 | Lind | |
| 2008/0307392 A1 | 12/2008 | Racca et al. | |
| 2009/0125131 A1* | 5/2009 | Eldridge et al. | 700/87 |
| 2010/0070242 A1 | 3/2010 | Renault et al. | |
| 2010/0161248 A1 | 6/2010 | Rajendran et al. | |

OTHER PUBLICATIONS

Fritz et al., An Overview of Hierarchical Control Flow Graph Models, Proceedings of the 1995 Winter Simulation Conference, 1995, pp. 1347-1355.*

Liang et al., A Port Ontology for Automated Model Compsition, Proceedings of the 2003 Winter Simulation Conference, 2003, pp. 613-622.*

Daum, Thorsten, "A JAVA Based System for Specifying Hierarchical Control Flow Graph Models," Proceedings of the 1997 Winter Simulation Conference, pp. 150-157 (1997).

Fritz, Douglas et al., "Hierarchical Control Flow Graph Models," Electrical Engineering and Computer Science, pp. 1-23 (1996).

Sargent, Robert G. et al., "Visual Interactive Modeling in a Java-based Hierarchical Modeling and Simulation System," SimVis, pp. 1-17 (1998).

* cited by examiner

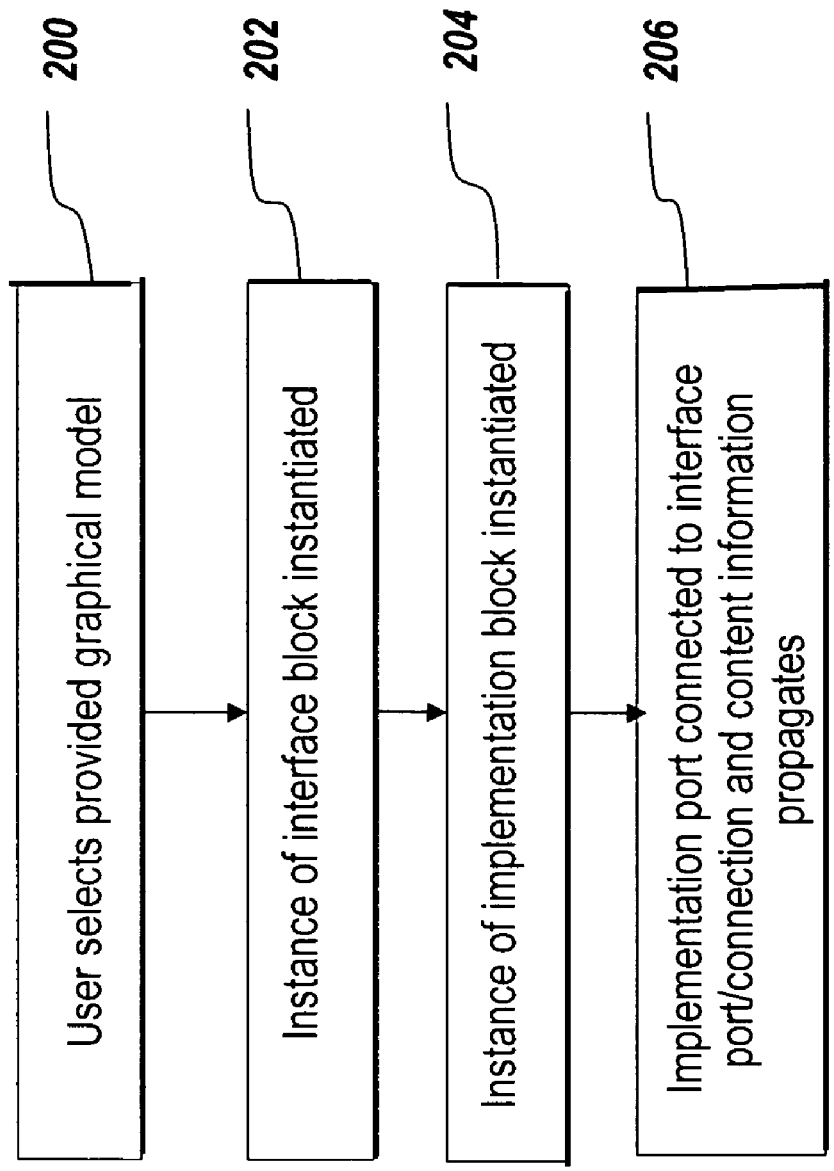

SYSTEM AND METHOD FOR PERFORMING STRUCTURAL TEMPLATIZATION

FIELD OF THE INVENTION

The illustrative embodiment of the present invention relates generally to graphical model design and more particularly to a mechanism for graphically performing structural templatization.

BACKGROUND

Graphical modeling languages use various types of components to represent structure and functionality graphically. For example, SIMULINK from The MathWorks, Inc. of Natick, Mass. is a block diagramming software package that represents structure and functionality graphically as model components using blocks and connections. Most graphical languages have the concept of organizing structure and functionality hierarchically and packaging certain hierarchical pieces into defined components that are stored in libraries or other locations. Using a defined component in a model is called 'instantiating' the component and the component as it is used in the model is an 'instance' of the defined component. One or many instances of a defined component may be instantiated in a model.

Most modern textual programming languages offer reusability, either by simple function libraries, class libraries or template libraries. Some textual programming languages extend component reusability by utilizing the concept of templatization. That is, reusable components leave some portion of their implementation to be defined by their point of use. For the purposes of this discussion, templatization may be subdivided into two simple categories, "functional templatization" and "structural templatization."

Functional templatization allows a function to infer its functionality based on the argument passed to the function. For example, the MATLAB language (a technical programming language from The MathWorks, Inc.) has no strong typing and a MATLAB function's implementation places certain constraints on the types and dimensions of arguments passed it. It is only when the type and dimension of the input arguments are known at runtime that the full functionality of the MATLAB function is defined. Similarly, C++ provides this functionality such that functions may defer the determination of the types of functions' arguments to their point of use. In C++ this may be accomplished either by polymorphism in which case the arguments' types are determined at runtime or by template functions, in which case the arguments' types are determined at compile time.

Structural templatization allows data structures, or more generally a collection of programming language constructs, to defer the behavior of their components to their point of use or instantiation. In C++ this may be accomplished by polymorphism or by class templates.

Some graphical modeling languages already include the concept of functional templatization. For example, SIMULINK blocks do not necessary require their input or parameter types (data type, dimension, sample time, etc) to be fully determined when the blocks are defined. Rather, these attributes are determined at their point of use. For example, the Gain block does not require a specific gain format or input dimension but does require them to be consistent at the point of use.

It would be beneficial to model designers in a graphical modeling environment to be able to graphically manage a form of structural templatization that allows implementation information from a component to be propagated to interface model components. Such a form of structural templatization would allow a designer to quickly merge interface information from a component with a defined interface with the content from other components thus increasing the flexibility, reusability, and efficiency of the model design process. Unfortunately, conventional graphical modeling languages do not provide a mechanism for graphically performing structural templatization that allows the interface of a model component to be separated from the content of the model component and propagated to other instantiated model components.

Brief Summary

The illustrative embodiment of the present invention provides a mechanism for graphically performing structural templatization in a graphical model. A model component with a defined interface is designated as an "interface component" and includes at least one external interface port and one or more internal ports. An instance of the interface component is instantiated in a graphical model and exposes the external interface port. A user also instantiates in the graphical model an instance of a component that is designated as an "implementation component" that includes model functional content and which exposes an implementation port. The user connects the exposed interface port and implementation port and the internal port information from the interface component programmatically merges with the content of the implementation component. The model designer is thus able to concentrate on separately providing interface and content information during the design of the graphical model.

In one aspect of the present invention, in a graphical modeling environment, a method of performing structural templatization includes the step of providing a graphical model with multiple components. The method instantiates an instance of an interface component into the graphical model. The instance of the interface component includes model connection information. The method also instantiates an instance of an implementation component into the graphical model. The instance of the implementation component includes model functional content. The method additionally connects the interface component and the implementation component. The connection information merging with the functional content of the implementation component.

In another aspect of the present invention in a graphical modeling environment, a method of performing structural templatization includes providing a graphical model that has multiple components. The method further includes the step of instantiating an instance of an interface component into the graphical model. The instantiated instance of the interface component exposes at least one external interface port and includes at least one internal port. The method also instantiates an instance of an implementation component into the graphical model. The instantiated instance of the implementation component exposes an external implementation port in the model. The external implementation port and the external interface port are then connected. The model functional content is automatically transferred from the instance of the implementation component to the interior of the instance of the interface component.

In one aspect of the present invention in a graphical modeling environment, a system for performing structural templatizing includes a graphical model with a plurality of components. The system also includes an interface component. An instance of the interface component is instantiated in the graphical model and exposes at least one external interface port. The interface component also includes at least one internal port. The system additionally includes an implementation component. An instance of the implementation component is instantiated in the graphical model. The instance of the implementation component exposes an external implementation port. The external implementation port is connected to the external interface port, and at least one internal port is automatically merging with the functional content of the implementation component.

In an aspect of the present invention in a distributed graphical modeling environment, a system for performing structural templatizing includes a first computing device interfaced with a network. The system also includes a second computing device in communication with the first computing device over the network. The second computing device hosts a graphical modeling environment that includes at least one graphical model. The graphical model has multiple components that include an instance of an interface component and an instance of the implementation component. The instance of the interface component exposes at least one external interface port and includes at least one internal port. The instance of the implementation component includes model functional content and exposes an external implementation port that is connected to the external interface port. The at least one internal port in the instance of the interface component is programmatically merged with the functional content of the instance of the implementation component. The system further includes a display device in communication with the first computing device. The display device displays to a user an output of the graphical modeling environment that is received over the network from the second computing device.

In one aspect of the present invention in a graphical modeling environment, a method of performing structural templatization includes the step of providing a graphical model with multiple components. The method also instantiates an instance of an interface component into the graphical model. The instance of the interface component includes model connection information. The method additionally instantiates an instance of an implementation component into the graphical model. The instance of the implementation component includes model functional content. The method connects an additional model component to an implementation port for the implementation component. The method further includes the step of connecting the interface component and the implementation component via the additional model component. The functional content of the implementation component is propagated programmatically to the interface component and is altered by the additional model component. The altered functional content is programmatically merged with the connection information of the interface component.

In another aspect of the present invention in a graphical modeling environment, a method of performing structural templatization, includes the step of providing a graphical model with a plurality of components. The method instantiates an instance of an interface component into the graphical model. The instance of the interface component includes model connection information. The method also instantiates an instance of an implementation component into the graphical model. The instance of the implementation component includes model functional content. The method additionally connects an additional model component to an implementation port for the implementation component and connects the interface component and the implementation component via the additional model component. The connection information of the interface component is propagated programmatically to the implementation component. The altered connection information is altered by the additional model component and programmatically merged with the functional content of the implementation component.

BRIEF DESCRIPTION OF THE DRAWINGS

The invention is pointed out with particularity in the appended claims. The advantages of the invention described above, as well as further advantages of the invention, may be better understood by reference to the following description taken in conjunction with the accompanying drawings, in which:

FIG. 6 is a flowchart of the sequence of steps followed by the illustrative embodiment of the present invention to instantiate an instance of an interface block and implementation block in a graphical model.

DETAILED DESCRIPTION

The illustrative embodiment of the present invention allows a graphical model designer to focus separately on I/O connections and model component content. The model designer is able to create blocks and other model components that specify connectivity while deferring functionality decisions (the term "block" as used herein should be read to refer to blocks, both library blocks and non-library blocks, and other graphical model components). Since the connectivity is merged automatically with a later added component specifying content, the illustrative embodiment enhances the modularity of the design process as the connectivity blocks may be utilized repeatedly with many different content components in the graphical model. Similarly, the many different connectivity blocks can utilize the same content components in the graphical model.

Figure 1:
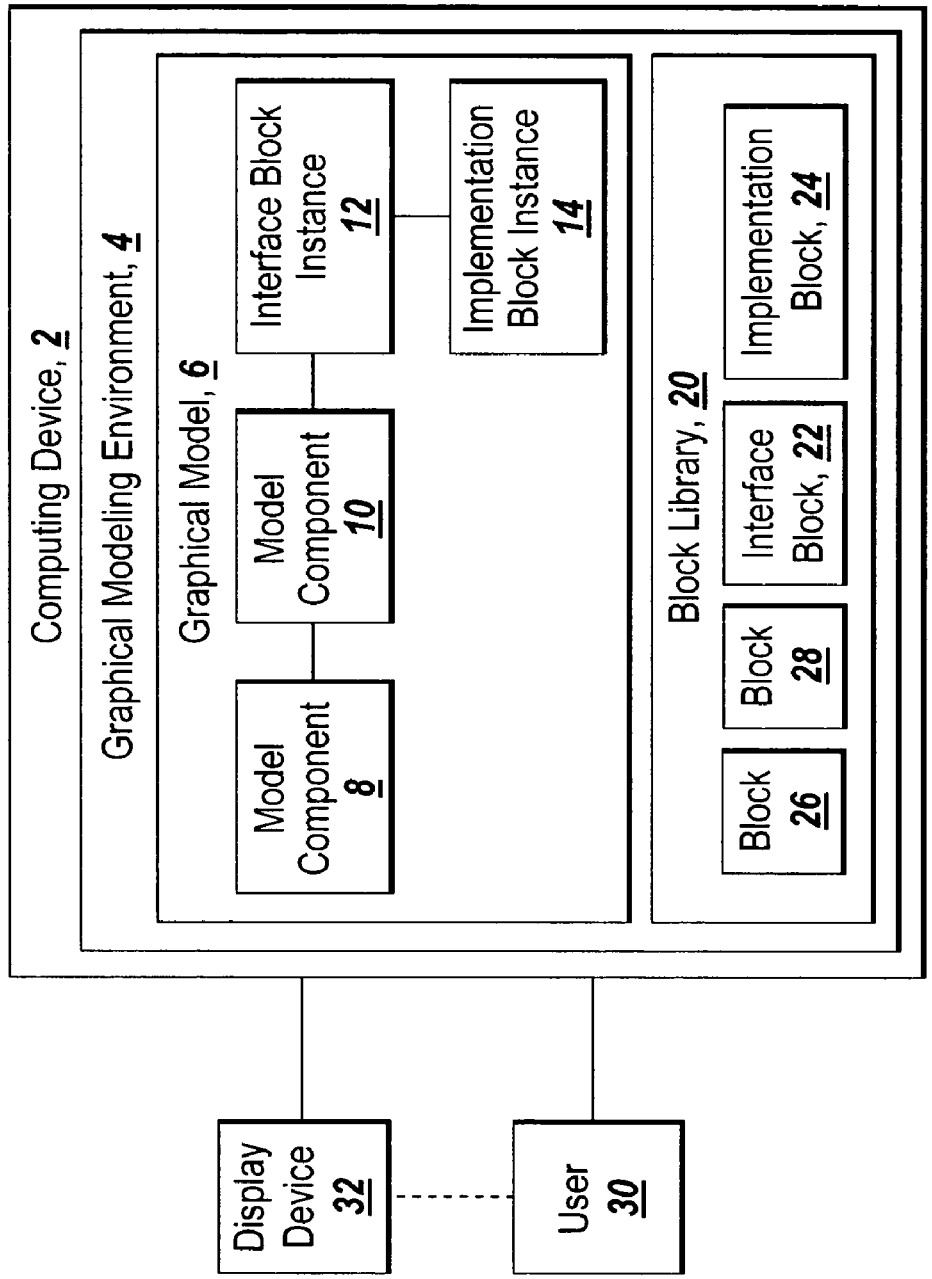
FIG. 1 depicts an environment suitable for practicing the illustrative embodiment of the present invention.

FIG. 1 depicts an environment suitable for practicing the illustrative embodiment of the present invention. A computing device 2 hosts a graphical modeling environment 4. The graphical modeling environment 4 includes at least one graphical model 6. The computing device 2 may be a PC, workstation, server, laptop, PDA, or some other type of computing device equipped with a processor and capable of hosting the graphical modeling environment 4. The computing device may be a single processor device, multi-core processor device or multiple processor device. The graphical modeling environment 4 may be a block diagram modeling environment, such as SIMULINK from The MathWorks, Inc. of Natick, Massachusetts or LABVIEW from National Instruments, Inc. of Austin, Tex., a statechart or data flow diagram environment, such as STATEFLOW from the MATHWORKS, or some other type of graphical modeling environment. The graphical model 6 may be a block diagram, data flow diagram, statechart or some other type of graphical model. A representation of the graphical model 6 may be displayed to a user 30 on a display device 32. The display device 32 may be any type of computer monitor or other video display device capable of displaying the graphical model representation to the user 30.

The graphical model 6 may include multiple model components such as model components 8 and 10, an instance of an interface block 12 and an instance of an implementation block 14. The instance of an interface block 12 and instance of an implementation block 14 may be instantiated from blocks stored in a component library. For example, the graphical modeling environment 4 may support model component library 20 including blocks 26 and 28 and interface block 22 and implementation block 24. The interface block 22 and implementation block 24 serve as the basis for the instance of the interface block 12 and instance of the implementation block 14 respectively that were instantiated in the graphical model 6. In other alternative implementations, the interface block 22 and implementation block 24 may be stored in locations other than a library that are accessible from the graphical modeling environment 4. The interface block 22, implementation block 24 and the instances of the interface block and implementation block 12 and 14 are discussed further below. It will be appreciated by those skilled in the art that although many of the examples contained herein are made with reference to a block diagram environment, the present invention is equally applicable to other graphical modeling environments and the examples and principles discussed herein with regard to block diagram environments should be understood to also apply to other graphical modeling environments.

Figure 2:
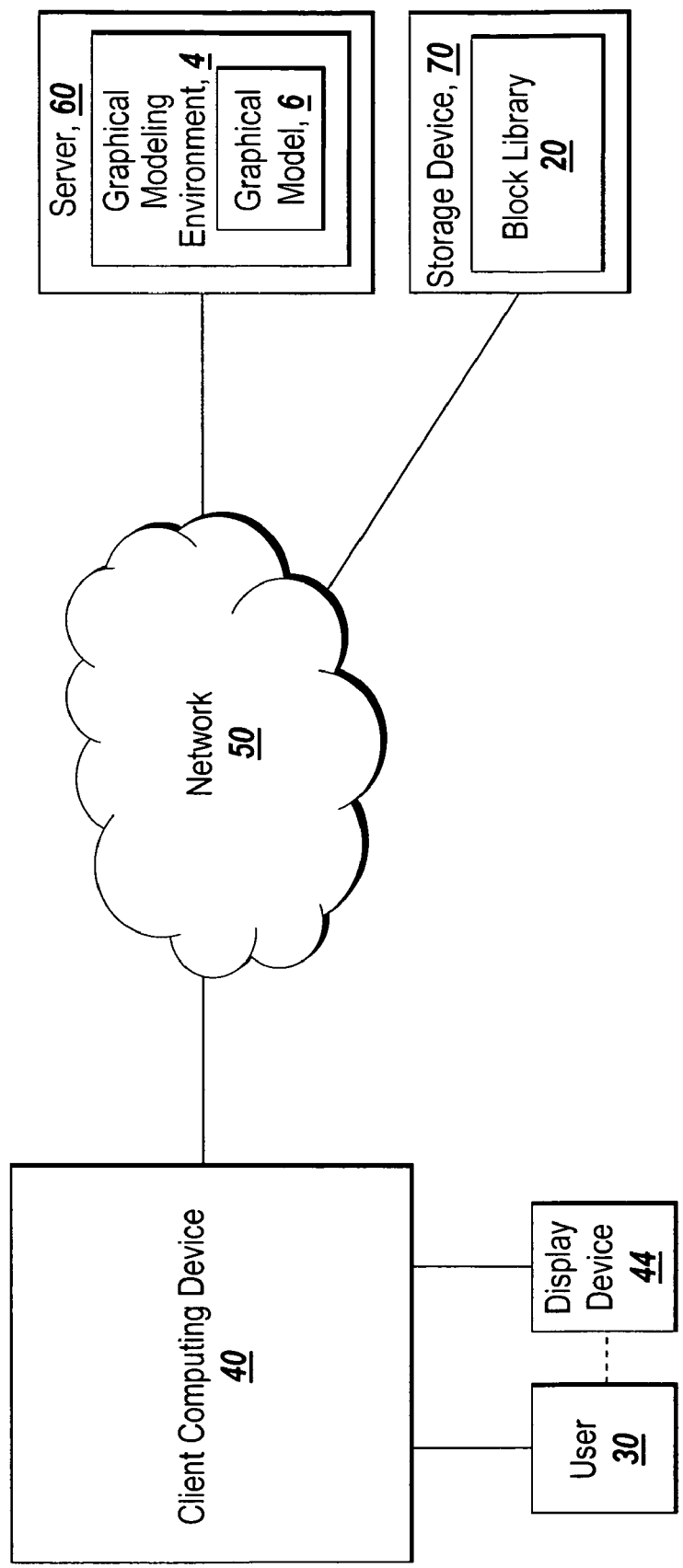
FIG. 2 depicts an alternate distributed environment suitable for practicing the illustrative embodiment of the present invention.

Those skilled in the art will recognize that the illustrative embodiment of the present invention may be implemented using other architectures than that shown in FIG. 1. For example, one such alternate implementation of the illustrative embodiment may be implemented in a distributed architecture such as that shown in FIG. 2. A user 42 accesses a first computing device 40 and an associated display device 44. The first computing device 40 communicates over a network 50 with a second computing device 60. The second computing device 60 hosts a graphical modeling environment 62 with at least one graphical model 64. A storage device 70 that is accessible over the network 50 to the graphical modeling environment 62 hosts a component library 80. The second computing device 60 and other components in the distributed architecture 60 may be virtual components. The network 90 may be the Internet, a local area network (LAN), a wide area network (WAN), a wireless network, an intranet, an extranet or some other type of network. The user 42 enters commands that are sent over the network 50 to the second computing device 60 and the graphical modeling environment 62. The second computing device 60 performs the processing required by the user's commands. The results of the execution of the user's commands are then transmitted over the network 50 to the first computing device where they are displayed for the user on the display device 44. It will be appreciated by those skilled in the art that other distributed and parallel architectures enabling the execution of the invention described herein are also within the scope of the invention.

As noted above, the illustrative embodiment of the present invention provides a graphical means for performing structural templatization. When implementing a library block or other model component the user can choose to defer some of the functionality of the library block or other model component by placing a subsystem block within the library block or other model component and marking it as an interface block.

The marking of the block may be done by selecting a parameter associated with the block. The graphical modeling environment is adjusted to recognize blocks or components marked as interface blocks or components. When marked as an interface block, the subsystem block exposes an interface port on its outside. The user may further define the interface by adding ports inside the block (input, output, connection, enable, trigger, if, etc) and add mask parameters to the interface block with a mask editor. The user provides values for the parameters on the interface blocks as constants or expressions comprised of the mask parameters on the library block. The user connects all of the regular ports exposed on the outside of the interface block to the other contents of the library block or other model component. The user also propagates the interface port up the hierarchy of the library block or other model component so that it is exposed on the outside of the library block or other model component.

When using the library block or other model component in a SIMULINK model, i.e., instantiating an instance of the interface block in the model, the user implements the interface defined within the block by employing another subsystem block in addition to the library block or model component instance and marking the added subsystem block as an implementation block. The implementation block includes model functional content and exposes an implementation port on its outside. The implementation port is then connected by the user to the interface port. In one implementation, when the user connects the implementation port to the interface port, the model functional content propagates programmatically to the interface block with a resulting functionality that operates as if the implementation block were substituted for the interface block. In another implementation, when the user connects the implementation port to the interface port, all of the ports placed inside the connected interface block appear within the implementation block but are not exposed on the outside of the interface block. The user implements the functionality of the block by placing blocks within the implementation block and connecting them to the ports already inside. These blocks may be parameterized with expressions that use the mask variables added to the interface block, they will be defined at runtime. The resulting functionality is also as if the implementation block were substituted for the interface block within the library block.

Figure 3A:
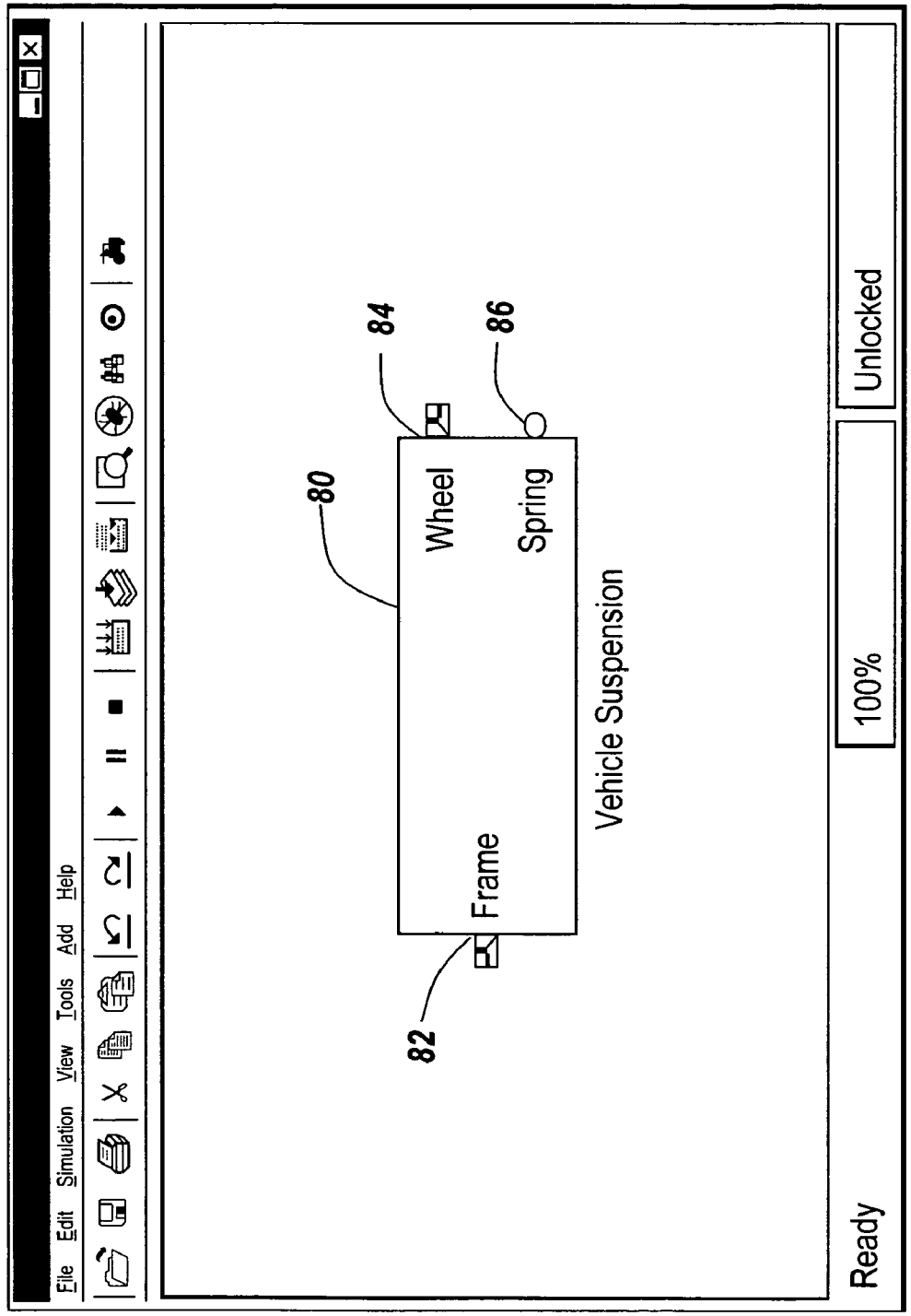
FIG. 3A depicts a library stored interface block used by one embodiment of the present invention.
Figure 3B:
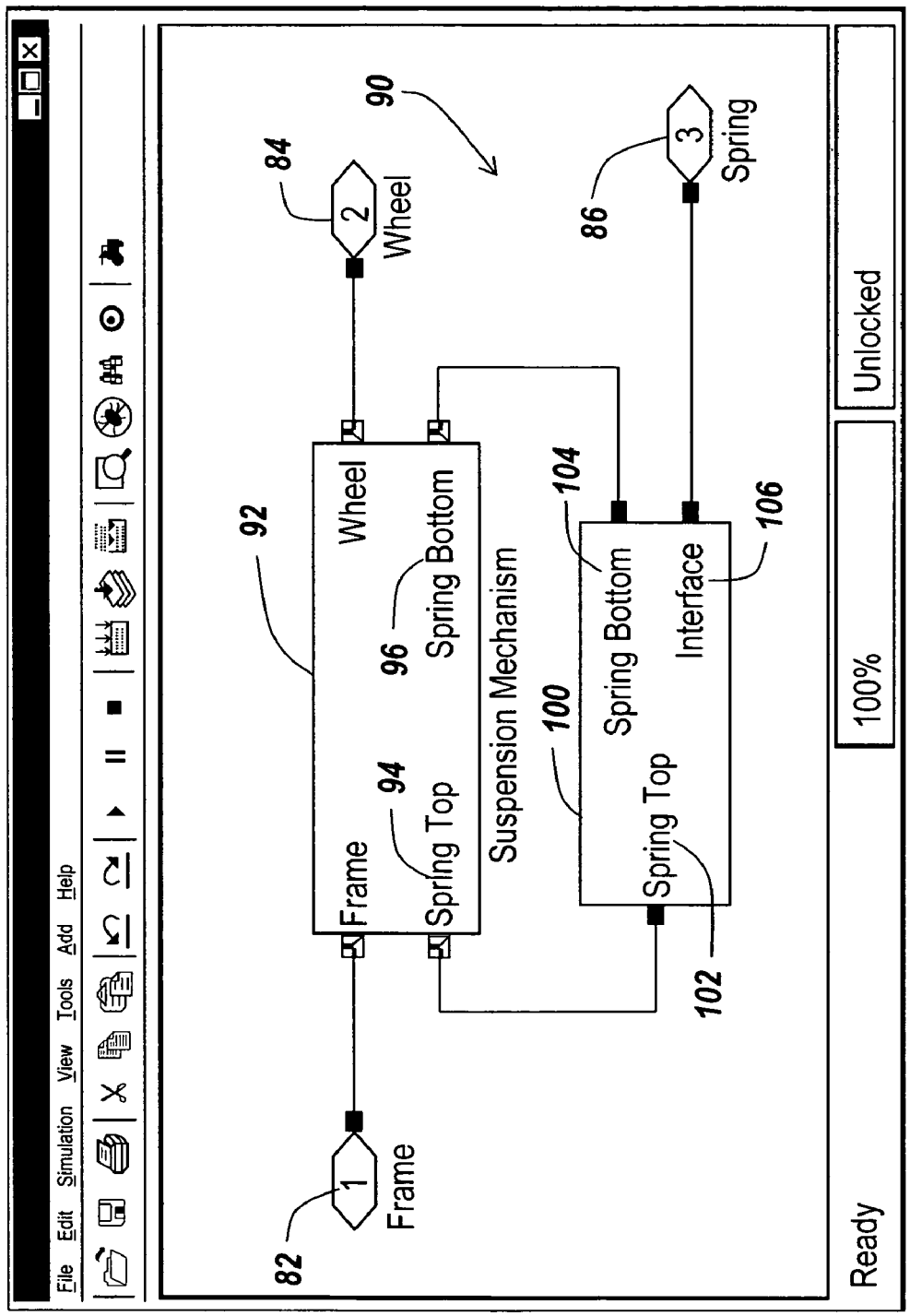
FIG. 3B depicts the internal view of the library block of FIG. 3A including the spring interface subsystem.
Figure 3C:
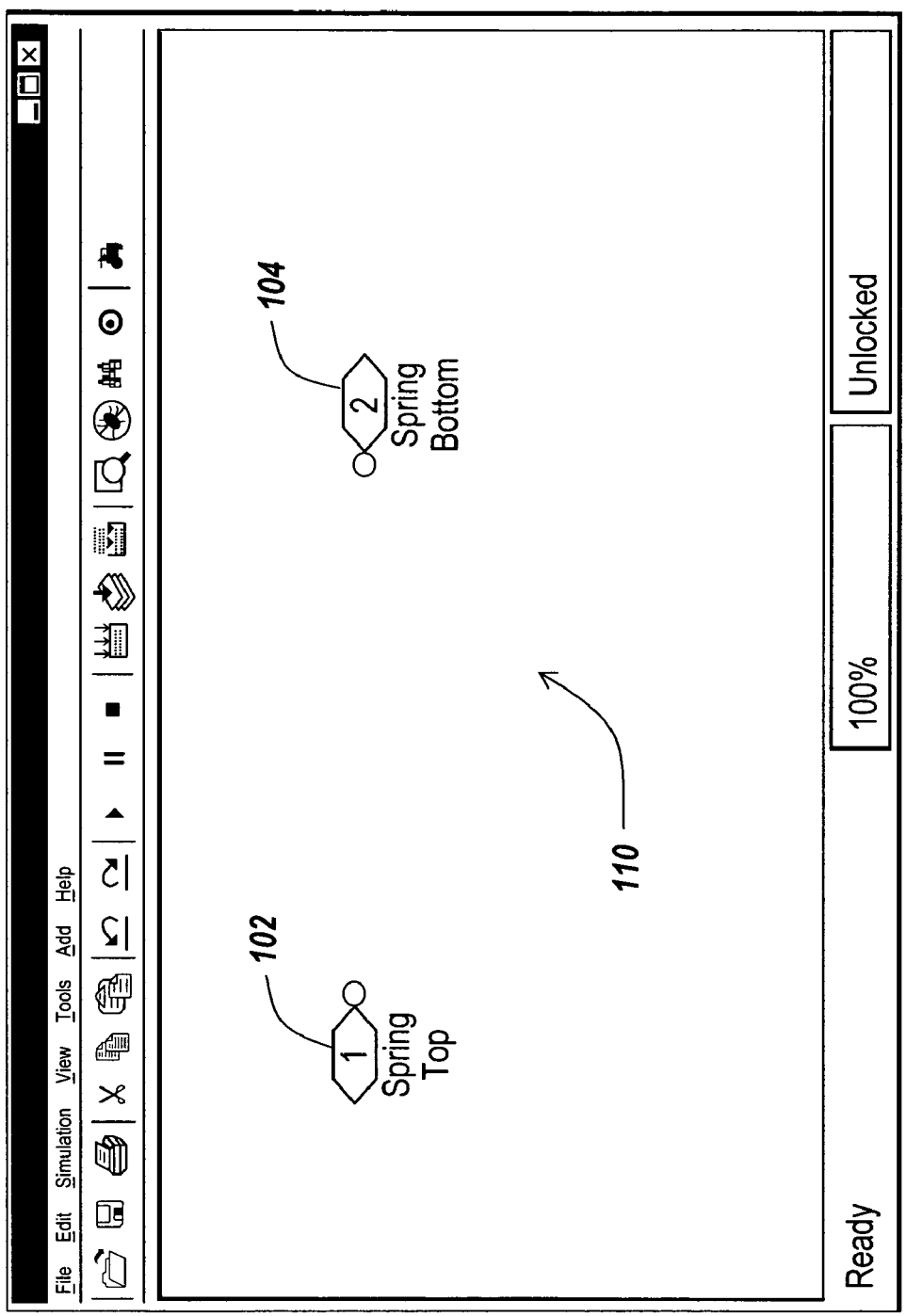
FIG. 3C depicts the internal view of the spring interface subsystem depicted in FIG. 3B.

The interface block of the present invention blocks may be further explained with reference to FIGS. 3A-3C. FIG. 3A depicts a library interface block 80 used by the present invention. The interface block 80 is for a vehicle suspension and includes a frame port 82 for connecting to a frame subsystem and a wheel port 84 for connecting to a wheel subsystem. The "Spring" port 86 on the Vehicle Suspension block 80 is an interface port of the present invention. The spring port 86 is automatically exposed on the outside of the library interface block 80 when the user designates the subsystem added to the block as an interface block as discussed above. FIG. 3B depicts the internal view of the library interface block 80 of FIG. 3A including the spring interface subsystem that causes the spring port 86 to be exposed. The stored library block 80 (the vehicle suspension block) includes a suspension mechanism block 92. The suspension mechanism includes the frame and wheel ports 82 and 84 discussed with regard to FIG. 3A above. The suspension mechanism block 92 also includes a spring top port 94 and spring bottom port 96. The user adds the spring interface block 100 and adds a spring top port 102 and spring bottom port 104 to connect to the spring top port 94 and spring bottom 96 respectively of the suspension mechanism block 92. Because the spring interface subsystem block 100 has been designated as an interface block by the user, it also includes the interface port 106 which exposes the spring port 86 on the outside of the vehicle suspension block 80. FIG. 3C depicts the internal view 110 of the spring interface subsystem 100 depicted in FIG. 3B. The interface subsystem block 100 contains no contents other than the connections (the spring top 102 and spring bottom 104) that comprise the interface.

Figure 4A:
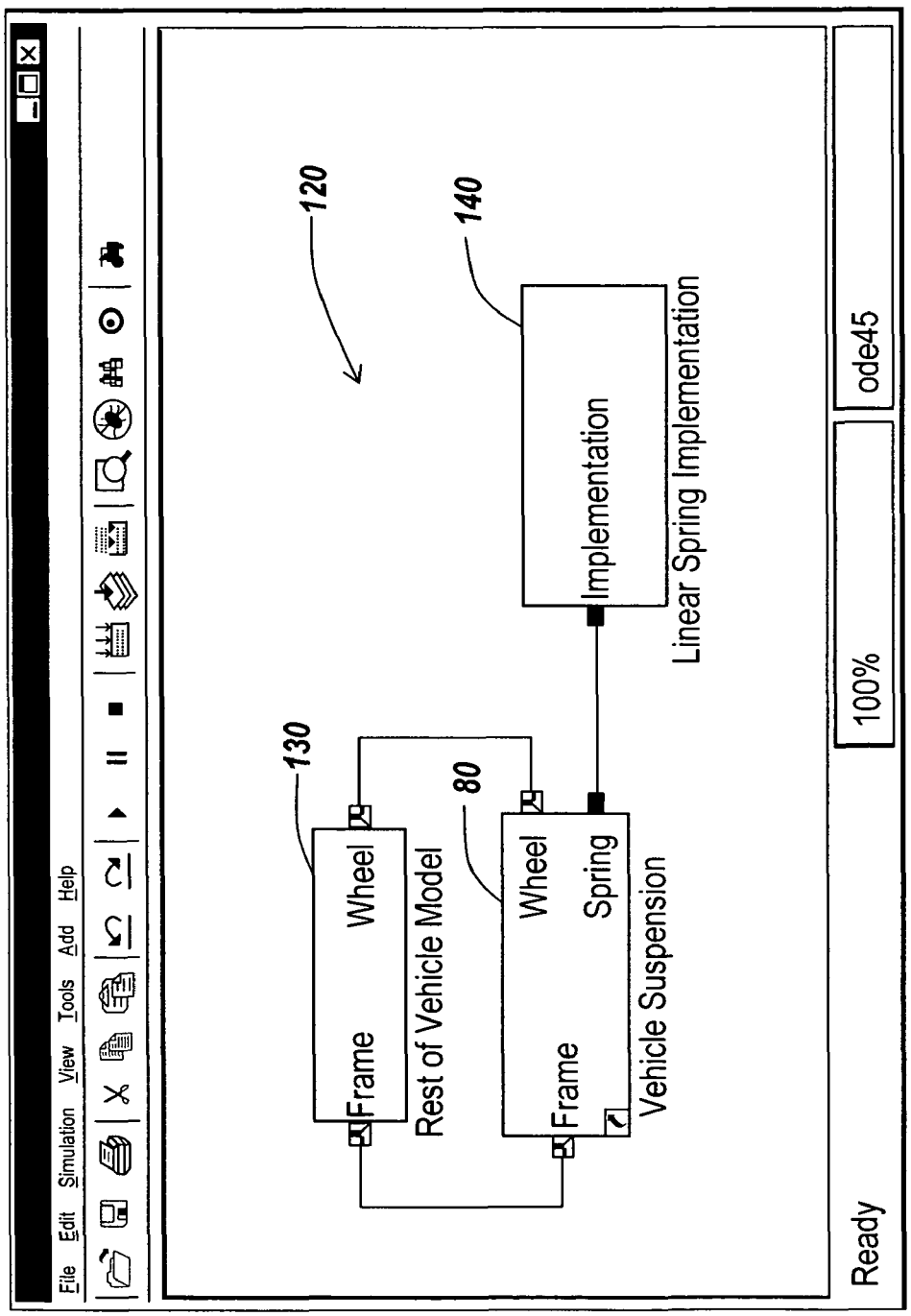
FIG. 4A depicts a graphical model of one embodiment of the present invention with an implementation block connected to an interface block.
Figure 4B:
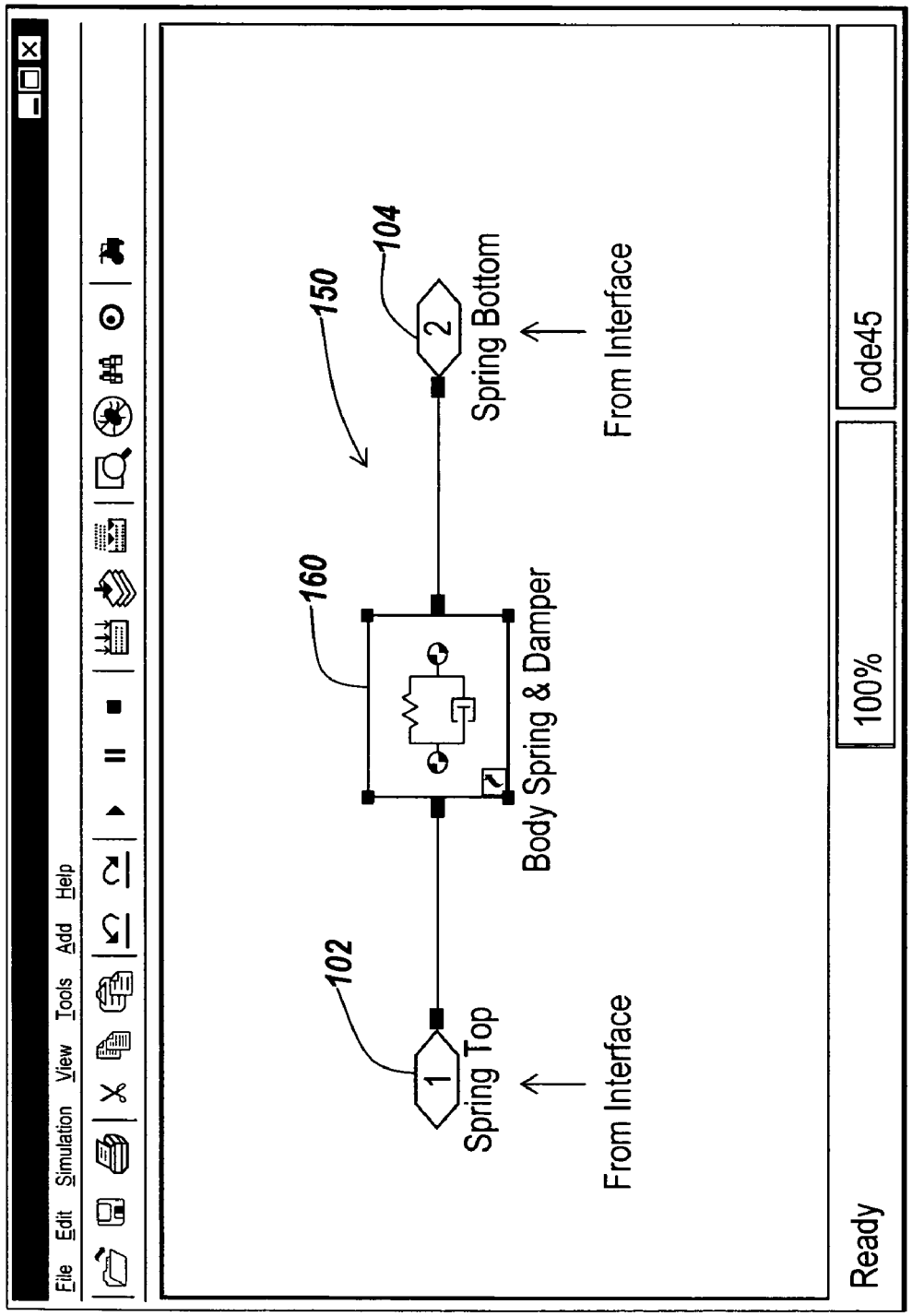
FIG. 4B depicts the internal view of the implementation block with the merged port information from the interface block.

Once the user has designated a block as an interface block and placed it in a graphical model, the user designates another subsystem block as an implementation block, places it in the model and connects it to an interface block. FIG. 4A depicts a graphical model of the present invention with an implementation block connected to an interface block. The graphical model 120 includes the vehicle suspension interface block 80, the rest of the vehicle model 130 to which the vehicle suspension block 80 is connected via the frame and wheel ports 82 and 84, and a linear implementation block 140 inserted by the user. The user connects the implementation port 142 to the spring interface port 86. As a result of the connection of the implementation port 142 to the spring interface port 86 the connection information from the interface block 80 is automatically propagated to the implementation block 140. The content information from the implementation block 140 is automatically propagated back to the interface block 80 and merges with the content of the interface block. The content of the interface block may solely consist of the interface, but also include further model components or library blocks FIG. 4B depicts the internal view of the implementation block with the merged port information from the interface block. The spring top port 102 and spring bottom port 104 from the interface block 80 connect to the body spring and damper block in the implementation block 140. The implementation block is thus automatically connected to the rest of the model through the interface in the vehicle suspension interface block 80. The spring ports 102 and 104 are not exposed on the outside of the implementation port. In the event the designer wishes to substitute a different block for the body spring and damper block 160, the user will be able replace the implementation block 140 without having to re-specify the interface information.

Additional components added to the connection from the implementation block to the interface block may affect the operation of the implementation block. For example, if a gain block with factor 2 is added between the implementation port 142 and the interface port 86, the implementation model structure fragment that propagates to the interface block passes through the gain block with the result that all of the parameters in the model structure fragment are multiplied by 2.

Figure 5A:
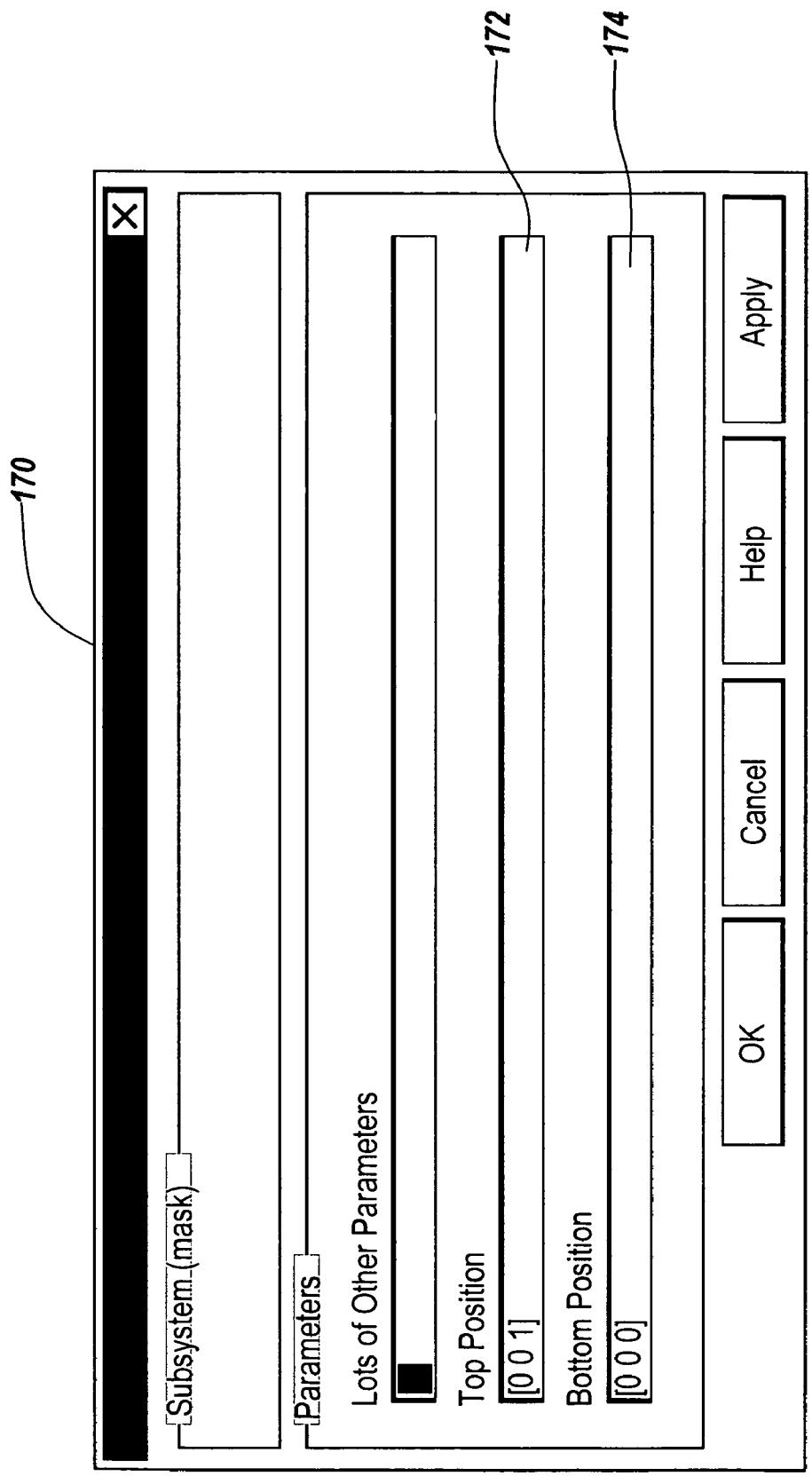
FIG. 5A depicts a mask dialog for the interface block of FIG. 3A.
Figure 5B:
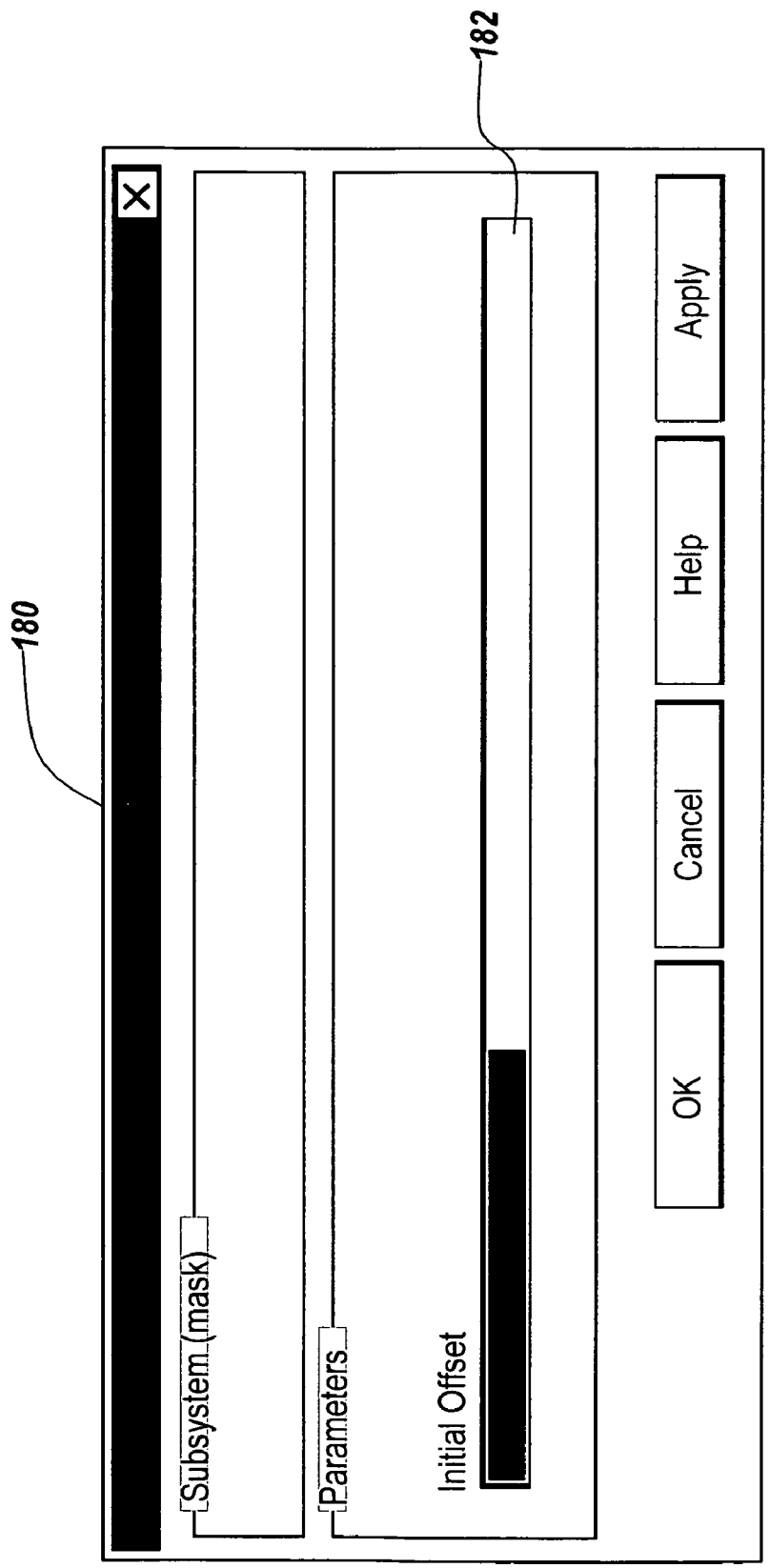
FIG. 5B depicts a mask dialog for the spring interface subsystem of FIG. 3B.

The user is able to specify parameter information for the interface block 80 and interface subsystem block 100 in the interface block. FIG. 5A depicts a mask dialog 170 for the interface block of FIG. 3A. Among many other parameters, there is Top Position (top_pos) 172 and Bottom Position (bottom_pos) 174. FIG. 5B depicts a mask dialog 180 for the spring interface subsystem of FIG. 3B. The Mask Dialog for the Spring Interface block. An Initial Offset (x0) 182 is computed based on the top_pos and bottom_pos parameters.

FIG. 6 is a flowchart of the sequence of steps followed by the illustrative embodiment of the present invention to instantiate an instance of an interface block and implementation block in a graphical model. The sequence of steps begins when a user selects a provided graphical model (step 200) and instantiates an instance of an interface block (step 202). The user then instantiates an instance of an implementation block (step 204) and connects the implementation port to the interface port (step 206). The connection information then propagates from the interface block to the implementation block. The content information from the implementation block then propagates to the interface block and merges with the content of the interface block (step 208).

The interface component and implementation components of the graphical model may be used during programmatic code generation. A code generation tool, such as the Real-Time Workshop tool for Simulink models., may be used to translate a selected portion of the block diagram (or the entire block diagram itself) into code. Such code could be in a number of possible forms. The code may be instructions in a high-level software language such as C, C++, Ada, etc., hardware descriptions of the block diagram portions in a language such as HDL, or custom code formats suitable for interpretation in some third-party software. Alternatively, the code may be instructions suitable for a hardware platform such as a microprocessor, microcontroller, or digital signal processor, etc., a platform independent assembly that can be re-targeted to other environments, or just-in-time code (instructions) that corresponds to sections of the block diagram for accelerated performance.

The present invention may be provided as one or more computer-readable programs embodied on or in one or more mediums. The mediums may be a floppy disk, a hard disk, a compact disc, a digital versatile disc, a flash memory card, a PROM, a RAM, a ROM, or a magnetic tape. In general, the computer-readable programs may be implemented in any programming language. Some examples of languages that can be used include MATLAB, FORTRAN, C, C++, C#, or JAVA. The software programs may be stored on or in one or more mediums as object code.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

We claim:

1. In a graphical modeling environment, a method of graphically performing structural templatization, comprising:
    displaying a graphical model with a plurality of components;
    instantiating an instance of an interface component into the graphical model, the instance of the interface component including model connection information and a subsystem component having undefined functionality;
    instantiating an instance of an implementation component into the graphical model, the instance of the implementation component including model functional content; and
    connecting graphically in the displayed model the instance of the interface component and the instance of the implementation component, the connection information of the instance of the interface component programmatically merging with the model functional content of the instance of the implementation component as a result of, and following, the graphical connection of the instance of the interface component and the instance of the implementation component, wherein the merging replaces the undefined functionality of the subsystem component in the interface component with the model functional content of the implementation component.

2. The method of claim 1 wherein the connection information is one of an input, output, connection, enable or trigger port.

3. The method of claim 1 wherein at least one of the interface component and the implementation component are stored in a library accessible to the graphical modeling environment.

4. The method of claim 1, wherein the connection information propagates programmatically from the instance of the interface component to the interior of the instance of the implementation component.

5. The method of claim 1 wherein the functional content of the instance of the implementation component propagates programmatically to the instance of the interface component.

6. The method of claim 1 wherein at least one of the instance of the interface component and the instance of the implementation component are used in the programmatic generation of code.

7. In a graphical modeling environment, a method of performing structural templatization, comprising:
    displaying a graphical model with a plurality of components;
    instantiating an instance of an interface component into the graphical model, the instance of the interface component including model connection information and exposing at least one external interface port and including at least one internal port and a subsystem component having undefined functionality, the instance of the interface component graphically depicted in the model;
    instantiating an instance of an implementation component into the graphical model, the instance of the implementation component including model functional content and exposing an external implementation port, the instance of the implementation component graphically depicted in the model; and
    connecting graphically in the displayed model the instance of the external implementation port and the instance of the external interface port, the model functional content propagating programmatically from the instance of the implementation component to the instance of the interface component to merge with the model connection information as a result of, and following, the graphical connection of the instance of the interface component and the instance of the implementation component, wherein the merging replaces the undefined functionality of the subsystem component in the interface component with the model functional content of the implementation component.

8. The method of claim 7, further comprising:
    adding, prior to the instantiation of the instance of the interface component into the graphical model, at least a second internal port to the instance of the interface component.

9. The method of claim 8 wherein the at least a second internal port is one of an input, output, connection, enable or trigger port.

10. The method of claim 7 wherein a user sets mask parameters for the instance of the interface component.

11. The method of claim 7 wherein at least one of the interface component and the implementation component are stored in a library accessible to the graphical modeling environment.

12. The method of claim 7, further comprising:
    adding at least one additional component within the instance of the implementation component.

13. The method of claim 12, further comprising:
    connecting the at least one additional component to at least one port propagated into the instance of the implementation component from the instance of the interface component.

14. The method of claim 12 wherein a user adds at least one additional port to the instance of the implementation component, the at least one additional port added by the user being used to connect the instance of the implementation component to the rest of the model.

15. The method of claim 7, further comprising:
    designating the instance of the interface component, the designating including:
    inserting a subsystem block into a block, and selecting a parameter associated with the subsystem block.

16. The method of claim 7, further comprising:
    propagating programmatically the at least one internal port from the instance of the interface component to a plurality of instances of an implementation component.

17. In a graphical modeling environment, a system for graphically performing structural templatization, comprising:
    a computing device, the computing device supporting a graphical modeling environment that includes:
        a graphical model with a plurality of components,
        an interface component, an instance of the interface component being instantiated in the graphical model, the instance of the interface component exposing at least one external interface port and including at least one internal port and a subsystem component having undefined functionality, the instance of the interface component graphically depicted in the model, and
        an implementation component, an instance of the implementation component being instantiated in and graphically depicted in the graphical model, the instance of the implementation component exposing an external implementation port, the external implementation port graphically connected to the external interface port in the graphical model, the at least one internal port of the interface component programmatically merging with the functional content of the implementation component as a result of, and following, the graphical connection of the instance of the interface component and the instance of the implementation component, wherein the merging replaces the undefined functionality of the subsystem component in the interface component with the model functional content of the implementation component; and
    a display device displaying the graphical model.

18. The system of claim 17, wherein the at least one internal port propagates programmatically from the instance of the interface component to the interior of the instance of the implementation component.

19. The system of claim 17, comprising:
    a library of model components, the library of model components including at least one of the interface component or the implementation component.

20. The system of claim 17 wherein at least one of the instance of the interface component and the instance of the implementation component are used in the programmatic generation of code.

21. In a distributed graphical modeling environment, a system for performing structural templatizing, comprising:
    a first computing device interfaced with a network;
    a second computing device in communication with the first computing device over the network, the second computing device hosting a graphical modeling environment, the graphical modeling environment including at least one graphical model, the graphical model having a plurality of components including an instance of an interface component and an instance of an implementation component, the instance of the interface component and the instance of the implementation component graphically depicted in the model, the instance of the interface component exposing at least one external interface port and including at least one internal port and a subsystem component having undefined functionality, the instance of the implementation component including model functional content and exposing an external implementation port, the external implementation port graphically connected in the graphical model to the external interface port, the at least one internal port from the interface instance programmatically merging with the functional content from the implementation instance as a result of, and following, the graphical connection of the instance of the interface component and the instance of the implementation component, wherein the merging replaces the undefined functionality of the subsystem component in the interface component with the model functional content of the implementation component; and a display device in communication with the first computing device, the display device displaying to a user an output of the graphical modeling environment received over the network from the second computing device.

22. The distributed system of claim 21, further comprising:

a storage location holding a model component library, the model component library including the interface component and the implementation component.

23. The distributed system of claim 22 wherein the storage location is remotely located from the server.

24. The system of claim 21 wherein at least one of the instance of the interface component and the instance of the implementation component are used in the programmatic generation of code.

25. A non-transitory medium holding computer-executable instructions for a method of graphically performing structural templatization, the instructions when executed causing one or more computing devices to:

display a graphical model with a plurality of components;

instantiate an instance of an interface component into the graphical model, the instance of the interface component exposing at least one external interface port and including at least one internal port and a subsystem component having undefined functionality, the instance of the interface component graphically depicted in the model;

instantiate an instance of an implementation component into the graphical model, the instance of the implementation component including model functional content and exposing an external implementation port, the instance of the implementation component graphically depicted in the model; and connect graphically the external implementation port of the instance of the implementation component and the external interface port of the instance of the interface component, the at least one internal port of the instance of the interface component programmatically merging with the functional content of the instance of the implementation component as a result of, and following, the graphical connection of the instance of the interface component and the instance of the implementation component, wherein the merging replaces the undefined functionality of the subsystem component in the interface component with the model functional content of the implementation component.

26. The medium of claim 25, wherein the at least one internal port propagates programmatically from the instance of the interface component to the interior of the instance of the implementation component.

27. The medium of claim 25, wherein the functional content from the instance of the implementation component propagates programmatically to the instance of the interface component.

28. The medium of claim 25 wherein the execution of the instructions further cause the one or more computing devices to:

add, prior to the instantiation of the instance of the interface component into the graphical model, at least a second internal port to the interface component.

29. The medium of claim 25 wherein the execution of the instructions further cause the one or more computing devices to:

add at least one additional component within the instance of the implementation component.

30. The medium of claim 29 wherein the execution of the instructions further cause the one or more computing devices to:

connect the at least one additional component to at least one port propagated into the instance of the implementation component from the instance of the interface component.

31. The medium of claim 25 wherein the execution of the instructions further cause the one or more computing devices to:

propagate programmatically the at least one internal port from the instance of the interface component to a plurality of instances of an implementation component.

32. The medium of claim 25 wherein at least one of the instance of the interface component and the instance of the implementation component are used in the programmatic generation of code.

33. A non-transitory medium holding computer-executable instructions for a method of performing structural templatization, the instructions when executed causing one or more computing devices to:

provide a graphical model with a plurality of components;

instantiate an instance of an interface component into the graphical model, the instance of the interface component including model connection information and a subsystem component having undefined functionality, the instance of the interface component graphically depicted in the model;

instantiate an instance of an implementation component into the graphical model, the instance of the implementation component graphically depicted in the model and including model functional content; and connect graphically in the model the instance of the interface component and the instance of the implementation component, the connection information programmatically merging with the functional content of the instance of the implementation component as a result of, and following, the graphical connection of the instance of the interface component and the instance of the implementation component, wherein the merging replaces the undefined functionality of the subsystem component in the interface component with the model functional content of the implementation component.

34. The medium of claim 33, wherein the connection information propagates programmatically from the instance of the interface component to the interior of the instance of the implementation component.

35. The medium of claim 34 wherein the connection information is one of an input, output, connection, enable or trigger port.

36. The medium of claim 34 wherein at least one of the interface component and the implementation component are stored in a library accessible to the graphical modeling environment.

37. The medium of claim 33 wherein at least one of the instance of the interface component and the instance of the implementation component are used in the programmatic generation of code.

38. In a graphical modeling environment, a method of graphically performing structural templatization, comprising:
- displaying a graphical model with a plurality of components;
- instantiating an instance of an interface component into the graphical model, the instance of the interface component including model connection information and a subsystem component having undefined functionality, the instance of the interface component graphically depicted in the model;
- instantiating an instance of an implementation component into the graphical model, the instance of the implementation component graphically depicted in the model and including model functional content; and
- connecting an additional model component to an implementation port for the instance of the implementation component;
- connecting graphically the instance of the interface component and the instance of the implementation component via the additional model component, the functional content of the instance of the implementation component propagating programmatically to the instance of the interface component, the functional content being altered by the additional model component and programmatically merged with the connection information of the interface component as a result of, and following, the graphical connection of the instance of the interface component and the instance of the implementation component, wherein the merging replaces the undefined functionality of the subsystem component in the interface component with the model functional content of the implementation component.

39. In a graphical modeling environment, a method of graphically performing structural templatization, comprising:
- displaying a graphical model with a plurality of components;
- instantiating an instance of an interface component into the graphical model, the instance of the interface component including model connection information and a subsystem component having undefined functionality, the instance of the interface component graphically depicted in the model;
- instantiating an instance of an implementation component into the graphical model, the instance of the implementation component graphically depicted in the model and including model functional content;
- connecting an additional model component to an implementation port for the instance of the implementation component; and
- connecting graphically the instance of the interface component and the instance of the implementation component via the additional model component, the connection information of the instance of the interface component propagating programmatically to the instance of the implementation component, the connection information being altered by the additional model component and programmatically merged with the functional content of the instance of the implementation component as a result of, and following, the graphical connection of the instance of the interface component and the instance of the implementation component, wherein the merging replaces the undefined functionality of the subsystem component in the interface component with the model functional content of the implementation component.

40. The method of claim 39 wherein the additional model component is a gain block and the altering of the connection information increases the value of at least one parameter by a multiplier equal to a factor for the gain block.

* * * * *

UNITED STATES PATENT AND TRADEMARK OFFICE
CERTIFICATE OF CORRECTION

| | |
|---|---|
| PATENT NO. | : 8,312,420 B1 |
| APPLICATION NO. | : 11/283564 |
| DATED | : November 13, 2012 |
| INVENTOR(S) | : Nathan E. Brewton et al. |

It is certified that error appears in the above-identified patent and that said Letters Patent is hereby corrected as shown below:

On Title Page 2, Item (56) References Cited, Other Publications, Column 2, line 1, "Compsition" should be --Composition--.

Signed and Sealed this
Fourteenth Day of May, 2013

Teresa Stanek Rea
*Acting Director of the United States Patent and Trademark Office*